United States Patent
Lin et al.

(10) Patent No.: US 12,255,679 B2
(45) Date of Patent: Mar. 18, 2025

(54) RADIO FREQUENCY CIRCUIT AND ELECTRONIC DEVICE

(71) Applicant: VIVO MOBILE COMMUNICATION CO., LTD., Dongguan (CN)

(72) Inventors: Jingqiu Lin, Dongguan (CN); Xiaojian Xie, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 0 days.

(21) Appl. No.: 18/201,218

(22) Filed: May 24, 2023

(65) Prior Publication Data
US 2023/0299810 A1    Sep. 21, 2023

Related U.S. Application Data

(63) Continuation of application No. PCT/CN2021/131437, filed on Nov. 18, 2021.

(30) Foreign Application Priority Data

Nov. 24, 2020  (CN) .......................... 202011329876.2

(51) Int. Cl.
*H04B 1/401*    (2015.01)
*H04B 1/04*    (2006.01)
(Continued)

(52) U.S. Cl.
CPC ........... *H04B 1/401* (2013.01); *H04B 1/0458* (2013.01); *H04W 4/80* (2018.02); *H04W 36/06* (2013.01); *H04W 84/12* (2013.01); *H04B 1/18* (2013.01)

(58) Field of Classification Search
CPC ........ H04B 1/401; H04B 1/0458; H04B 1/18; H04W 36/06; H04W 36/302; H04W 84/12; H04W 84/18; H04W 4/80
See application file for complete search history.

(56) References Cited

U.S. PATENT DOCUMENTS 7,701,410 B2    4/2010   Li et al.
11,452,110 B1*  9/2022   Jorgovanovic .... H04W 72/1215
(Continued)

FOREIGN PATENT DOCUMENTS

CN    106712801 A    5/2017
CN    108693520 A    10/2018
(Continued)

OTHER PUBLICATIONS

Machine translation of CN-112272041-A (Year: 2021).*
(Continued)

*Primary Examiner* — Jean B Corrielus
(74) *Attorney, Agent, or Firm* — IPX PLLC (57) ABSTRACT

A radio frequency circuit and an electronic device are provided. The circuit includes a first WIFI signal transmission port, a Bluetooth signal transmission port, a switch component, a first antenna, and a second antenna. The first WIFI signal transmission port is separately electrically connected to the first antenna and the second antenna by using the switch component, and the Bluetooth signal transmission port is separately electrically connected to the first antenna and the second antenna by using the switch component. When the switch component is in a first state, the switch component connects the Bluetooth signal transmission port to the first antenna, and the switch component connects the first WIFI signal transmission port to the second antenna.

9 Claims, 4 Drawing Sheets

(51) Int. Cl.
*H04W 4/80* (2018.01)
*H04W 36/06* (2009.01)
*H04W 84/12* (2009.01)
*H04B 1/18* (2006.01)

(56) References Cited

U.S. PATENT DOCUMENTS

| | | |
|---|---|---|
| 2009/0156126 A1 | 6/2009 | Willis |
| 2009/0262042 A1* | 10/2009 | Li .................... H04B 1/0064 343/876 |
| 2011/0105026 A1* | 5/2011 | Hsiao ................ H04B 1/006 455/41.2 |
| 2016/0353232 A1 | 12/2016 | Liu et al. |
| 2016/0360564 A1 | 12/2016 | Liu et al. |

FOREIGN PATENT DOCUMENTS

| | | | |
|---|---|---|---|
| CN | 110225194 A | 9/2019 | |
| CN | 111726128 A | 9/2020 | |
| CN | 111756388 A | 10/2020 | |
| CN | 211860095 U | 11/2020 | |
| CN | 112436862 A | 3/2021 | |
| EP | 3346797 B1 * | 3/2021 | ........... H04B 1/0053 |

OTHER PUBLICATIONS

Machine translation of DE-102018202879-B4 (Year: 2022).*
Extended European Search Report issued in related European Application No. 21896875.8, mailed Mar. 20, 2024, 7 pages.

* cited by examiner

RADIO FREQUENCY CIRCUIT AND ELECTRONIC DEVICE

CROSS-REFERENCE TO RELATED APPLICATIONS

This application is a continuation of International Application No. PCT/CN2021/131437, filed Nov. 18, 2021, which claims priority to Chinese Patent Application No. 202011329876.2, filed Nov. 24, 2020. The entire contents of each of the above-referenced applications are expressly incorporated herein by reference.

TECHNICAL FIELD

This application relates to the field of electronic product technologies, and in particular, to a radio frequency circuit and an electronic device.

BACKGROUND

With the development of mobile communication technologies, a quantity of antennas of an electronic device continuously increases, and consequently, antenna space and environment of original Bluetooth and wireless fidelity (WIFI) in the electronic device deteriorate, and further Bluetooth signal quality and WIFI signal quality deteriorate. Especially, in a process of listening to audio by using Bluetooth, when signal quality decreases, a phenomenon such as signal lag may occur, and user experience is significantly affected. It can be learned that in a related technology, there is a problem that Bluetooth signal quality and WIFI signal quality are relatively poor in the electronic device.

SUMMARY

Embodiments of this application are to provide a radio frequency circuit and an electronic device.

According to a first aspect, an embodiment of this application provides a radio frequency circuit, including: a first WIFI signal transmission port, a Bluetooth signal transmission port, a switch component, a first antenna, and a second antenna.

The first WIFI signal transmission port is separately electrically connected to the first antenna and the second antenna by using the switch component, and the Bluetooth signal transmission port is separately electrically connected to the first antenna and the second antenna by using the switch component.

In a case that the switch component is in a first state, the switch component connects the Bluetooth signal transmission port to the first antenna, and the switch component connects the first WIFI signal transmission port to the second antenna.

In a case that the switch component is in a second state, the switch component connects the Bluetooth signal transmission port to the second antenna, and the switch component connects the first WIFI signal transmission port to the first antenna.

According to a second aspect, an embodiment of this application further provides an electronic device, including the radio frequency circuit according to the first aspect.

In the embodiments of this application, the switch component is disposed, so that when a Bluetooth signal is relatively poor, the switch component can be controlled to switch an operating state, to switch an antenna that is connected to the Bluetooth signal transmission port, thereby improving Bluetooth signal quality. In addition, when a WIFI signal is relatively poor, the switch component may also be controlled to switch an operating state, to switch an antenna that is connected to the first WIFI signal transmission port, thereby improving WIFI signal quality.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and the character "/" generally represents an "or" relationship between associated objects.

With reference to the accompanying drawings, a radio frequency circuit and an electronic device provided in the embodiments of this application are described in detail below by using a specific embodiment and an application scenario thereof.

FIG. 1 to FIG. 4 show a radio frequency circuit according to an embodiment of this application. The radio frequency circuit includes a first WIFI signal transmission port 100, a Bluetooth signal transmission port 200, a switch component, a first antenna 300, and a second antenna 400.

The first WIFI signal transmission port 100 is separately electrically connected to the first antenna 300 and the second antenna 400 by using the switch component, and the Bluetooth signal transmission port 200 is separately electrically connected to the first antenna 300 and the second antenna 400 by using the switch component.

In a case that the switch component is in a first state, the switch component connects the Bluetooth signal transmission port 200 to the first antenna 300, and the switch component connects the first WIFI signal transmission port 100 to the second antenna 400.

In a case that the switch component is in a second state, the switch component connects the Bluetooth signal transmission port 200 to the second antenna 400, and the switch component connects the first WIFI signal transmission port 100 to the first antenna 300.

The first WIFI signal transmission port 100 may be a signal port of a WIFI channel in an electronic device, and the first WIFI signal transmission port 100 may be either a signal receiving port or a signal transmitting port, for example, may be a 2.4 G WIFI receive (Receive X, RX) port or a 2.4 G WIFI transmit (Transmit X, TX) port. Correspondingly, the Bluetooth signal transmission port 200 may be a signal port of a Bluetooth signal channel in the electronic device.

The switch component may be formed by combining multiple different switches. It should be understood that in some embodiment, a specific combination manner of the switches in the switch component is not limited, provided that first state and the second state can be implemented and a purpose of switching between the first state and the second state can be implemented.

The first antenna 300 and the second antenna 400 may be common antennas in the electronic device, for example, may be built-in antennas in the electronic device, or may be external antennas formed in a metal bezel of the electronic device.

In this implementation, the switch component is disposed, so that when a Bluetooth signal is relatively poor, the switch component can be controlled to switch an operating state, to switch an antenna that is connected to the Bluetooth signal transmission port 200, thereby improving Bluetooth signal quality. In addition, when a WIFI signal is relatively poor, the switch component may also be controlled to switch an operating state, to switch an antenna that is connected to the first WIFI signal transmission port 100, thereby improving WIFI signal quality.

In some embodiments, the radio frequency circuit further includes a second WIFI signal transmission port 500, and the second WIFI signal transmission port 500 is separately electrically connected to the first antenna 300 and the second antenna 400 by using the switch component.

In a case that the switch component is in a third state, the switch component connects one of the first WIFI signal transmission port 100 or the second WIFI signal transmission port 500 to the first antenna 300 and connects the other to the second antenna 400.

The second WIFI signal transmission port 500 may be a signal port of a WIFI channel in the electronic device, and the first WIFI signal transmission port 100 may be either a signal receiving port or a signal transmitting port, for example, may be a 2.4 G WIFI RX port or a 2.4 G WIFI TX port. It should be understood that the first WIFI signal transmission port 100 and the second WIFI signal transmission port 500 may be signal ports of different WIFI channels in the electronic device, or may be different ports of a same WIFI channel.

In this implementation, the second WIFI signal transmission port 500 is disposed, so that the switch component may separately connect the second WIFI signal transmission port 500 to the first antenna 300 and the second antenna 400. In this way, when a Bluetooth function of the electronic device is in a disabled state, one of the first WIFI signal transmission port 100 or the second WIFI signal transmission port 500 may be connected to the first antenna 300, and the other is connected to the second antenna 400. In this case, the first antenna 300 and the second antenna 400 are simultaneously used as WIFI antennas, so that WIFI signal quality can be further improved.

Figure 1:
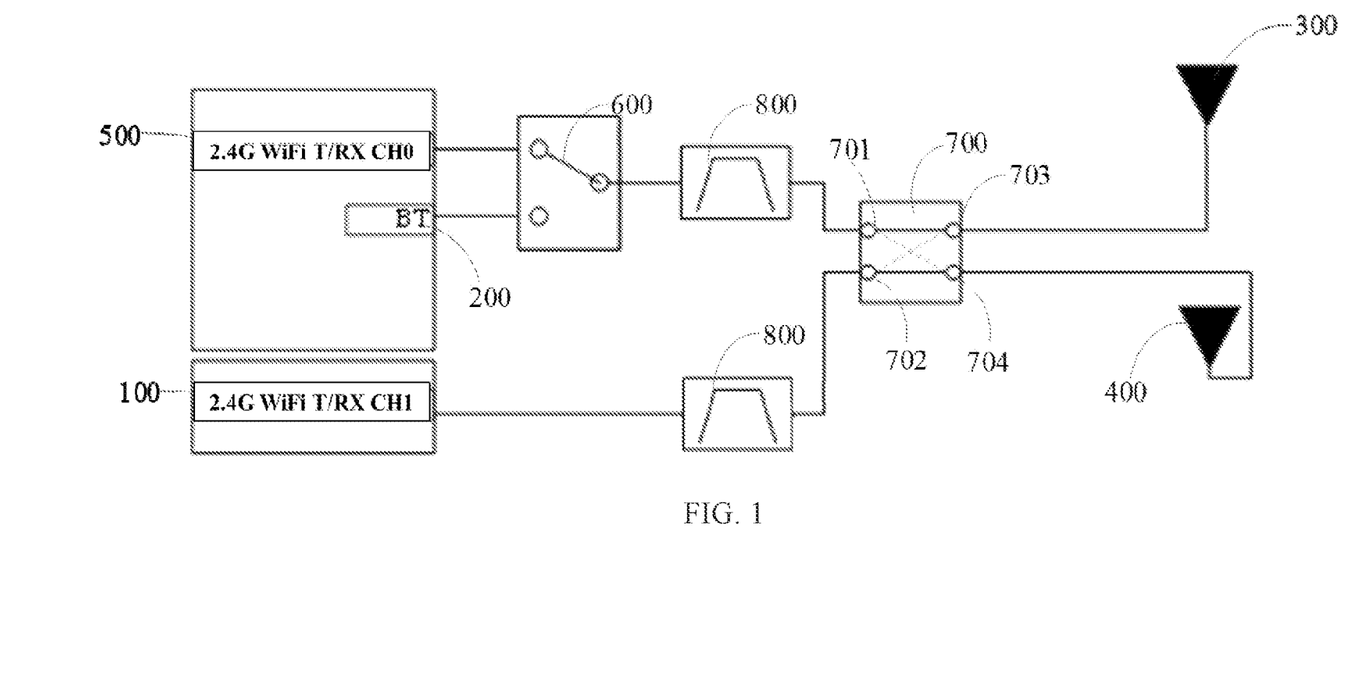
FIG. 1 is a first schematic structural diagram of a radio frequency circuit according to an embodiment of this application.
Figure 2:
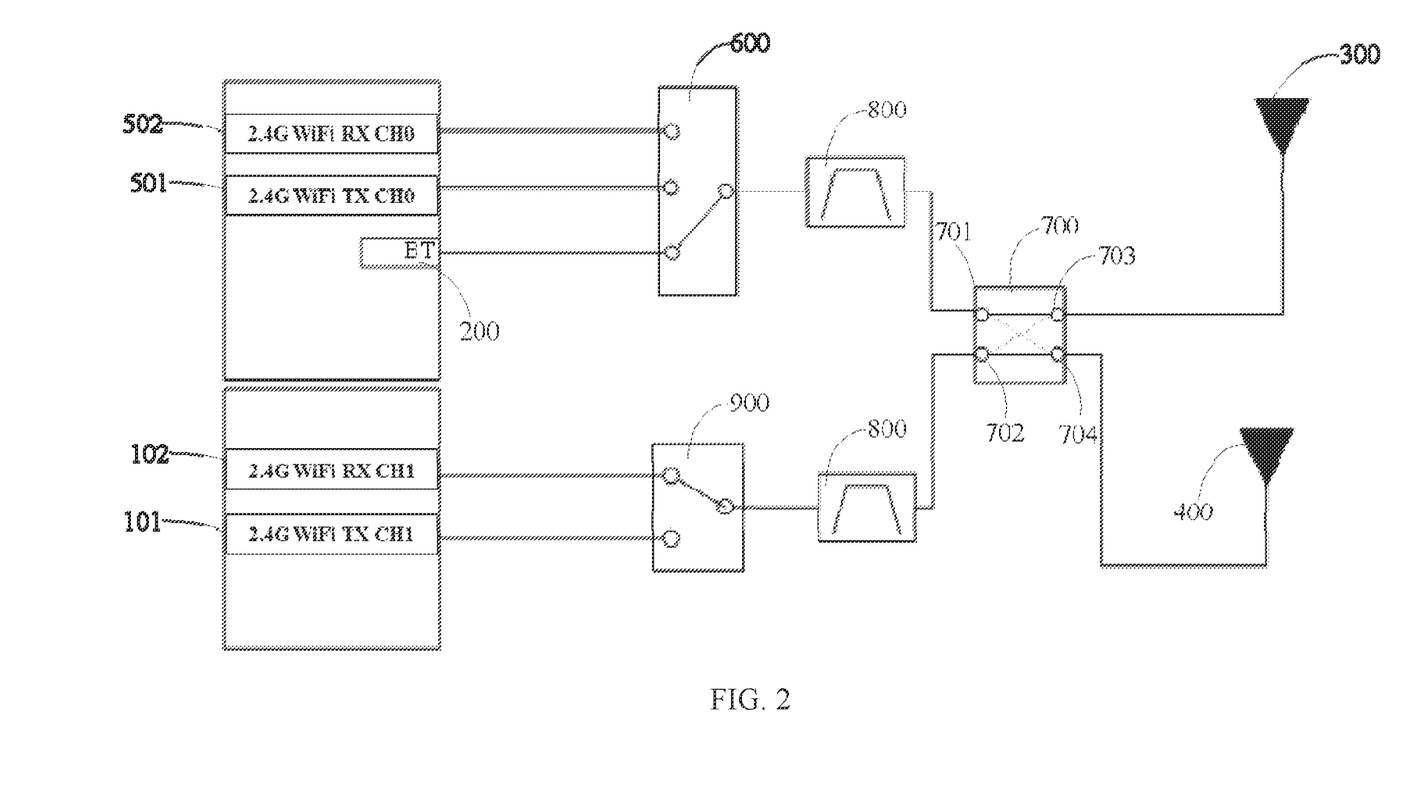
FIG. 2 is a second schematic structural diagram of a radio frequency circuit according to an embodiment of this application.

In some embodiments, the switch component includes a first switch 600 and a second switch 700, the second switch 700 is a double-pole double-throw switch, the second switch 700 includes a first end and a second end, one of the first end or the second end is an input end, and the other is an output end.

The first WIFI signal transmission port 100 is electrically connected to a second connection point 702 of the first end, and the second WIFI signal transmission port 500 and the Bluetooth signal transmission port 200 are separately electrically connected to a first connection point 701 of the first end by using the first switch 600.

The first antenna 300 is electrically connected to a third connection point 703 of the second end, and the second antenna 400 is electrically connected to a fourth connection point 704 of the second end.

In a case that the switch component is in the first state, the first switch 600 connects the Bluetooth signal transmission port 200 to the first connection point 701 of the second switch 700, the second switch 700 connects the first connection point 701 to the first antenna 300, and the second switch 700 connects the second connection point 702 to the second antenna 400.

In a case that the switch component is in the second state, the first switch 600 connects the Bluetooth signal transmission port 200 to the first connection point 701 of the second switch 700, the second switch 700 connects the first connection point 701 to the second antenna 400, and the second switch 700 connects the second connection point 702 to the first antenna 300.

In a case that the switch component is in the third state, the first switch 600 connects the second WIFI signal transmission port 500 to the first connection point 701 of the second switch 700, and the second switch 700 connects one of the first connection point 701 or the second connection point 702 to the first antenna 300, and connects the other to the second antenna 400.

In some embodiments, as shown in FIG. 1, the first switch 600 may be a single-pole double-throw switch. A movable end of the first switch 600 is electrically connected to the connection point 701 of the second switch 700 by using a filter 800, a first fixed end of the first switch 600 is electrically connected to the second WIFI signal transmission port 500, and a second fixed end of the first switch 600 is electrically connected to the Bluetooth signal transmission port 200. In this way, when the movable end of the first switch 600 is connected to the first fixed end of the first switch 600, the first connection point 701 is connected to the second WIFI signal transmission port 500. When the movable end of the first switch 600 is connected to the second fixed end of the first switch 600, the first connection point 701 is connected to the Bluetooth signal transmission port 200.

The second switch 700 includes two operating states. A first operating state of the second switch 700 is: The first connection point 701 is connected to the third connection point 703, and the second connection point 702 is connected to a fourth connection point 704. A second operating state of the second switch 700 is: The first connection point 701 is connected to the fourth connection point 704, and the second connection point 702 is connected to the third connection point 703.

The first WIFI signal transmission port 100 is electrically connected to the second connection point 702 of the first end by using the filter 800.

In some embodiments, the first antenna 300 is electrically connected to the third connection point 703, and the second antenna 400 is electrically connected to the fourth connection point 704. In a case that the switch component is in the first state, the first switch 600 connects the Bluetooth signal transmission port 200 to the first connection point 701 of the second switch 700. In this case, the second switch 700 is in the first operating state, the second switch 700 connects the first connection point 701 to the first antenna 300, and the second switch 700 connects the second connection point 702 to the second antenna 400.

In a case that the switch component is in the second state, the first switch 600 connects the Bluetooth signal transmission port 200 to the first connection point 701 of the second switch 700. In this case, the second switch 700 is in the second operating state, the second switch 700 connects the first connection point 701 to the second antenna 400, and the second switch 700 connects the second connection point 702 to the first antenna 300.

In a case that the switch component is in the third state, the first switch 600 connects the second WIFI signal transmission port 500 to the first connection point 701 of the second switch 700. In this case, the second switch 700 is in the first operating state or the second operating state, and the second switch 700 connects one of the first connection point 701 or the second connection point 702 to the first antenna 300 and connects the other to the second antenna 400.

In this implementation, through setting, the first switch 600 cooperates with the second switch 700, so that the switch component switches among the first state, the second state, and the third state.

In some embodiments, the switch component further includes a third switch 900. The third switch 900 is a single-pole double-throw switch, the first WIFI signal transmission port 100 includes a first receive sub-port 101 and a first transmit sub-port 102, and the first receive sub-port 101 and the first transmit sub-port 102 are separately electrically connected to the second connection point 702 by using the third switch 900.

The first switch 600 is a single-pole three-throw switch, the second WIFI signal transmission port 500 includes a second receive sub-port 501 and a second transmit sub-port 502, and the second receive sub-port 501, the second transmit sub-port 502, and the Bluetooth signal transmission port 200 are separately electrically connected to the first connection point 701 by using the first switch 600.

As shown in FIG. 2, in some embodiments, the third switch 900 is a single-pole double-throw switch, a movable end of the third switch 900 is electrically connected to the second connection point 702 of the second switch 700 by using a filter 800, a first fixed end of the third switch 900 is electrically connected to a first receive sub-port 101, and a second fixed end of the third switch 900 is electrically connected to a first transmit sub-port 102. In this way, when the electronic device receives data by using WIFI, the movable end of the third switch 900 may be electrically connected to the first fixed end of the third switch 900, so that the second connection point 702 is connected to the first receive sub-port 101; and when the electronic device sends data by using WIFI, the movable end of the third switch 900 and the second fixed end of the third switch 900 may be connected, so that the second connection point 702 is connected to the first transmit sub-port 102.

As shown in FIG. 2, in some embodiments, the first switch 600 is a single-pole three-throw switch, a movable end of the first switch 600 is electrically connected to the first connection point 701 of the second switch 700 by using a filter 800, a first fixed end of the first switch 600 is electrically connected to the second receive sub-port 501, a second fixed end of the first switch 600 is electrically connected to the Bluetooth signal transmission port 200, and a third fixed end of the first switch 600 is electrically connected to the second transmit sub-port 502. In this way, when the electronic device transmits data by using Bluetooth, the movable end of the first switch 600 may be connected to the second fixed end of the first switch 600; when the electronic device receives data by using WIFI, the movable end of the first switch 600 may be connected to the first fixed end of the first switch 600; and when the electronic device sends data by using WIFI, the movable end of the first switch 600 may be connected to the third fixed end of the first switch 600.

Figure 3:
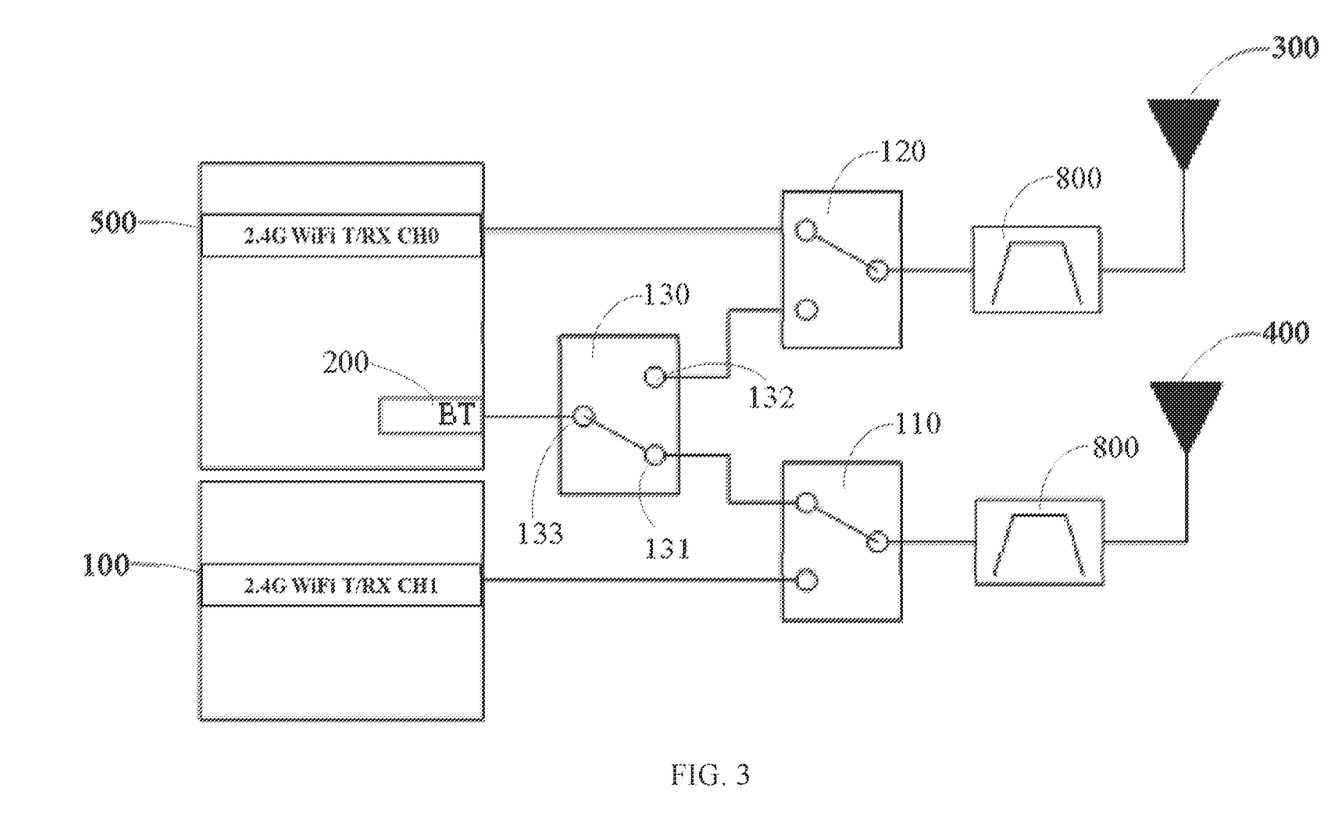
FIG. 3 is a third schematic structural diagram of a radio frequency circuit according to an embodiment of this application.
Figure 4:
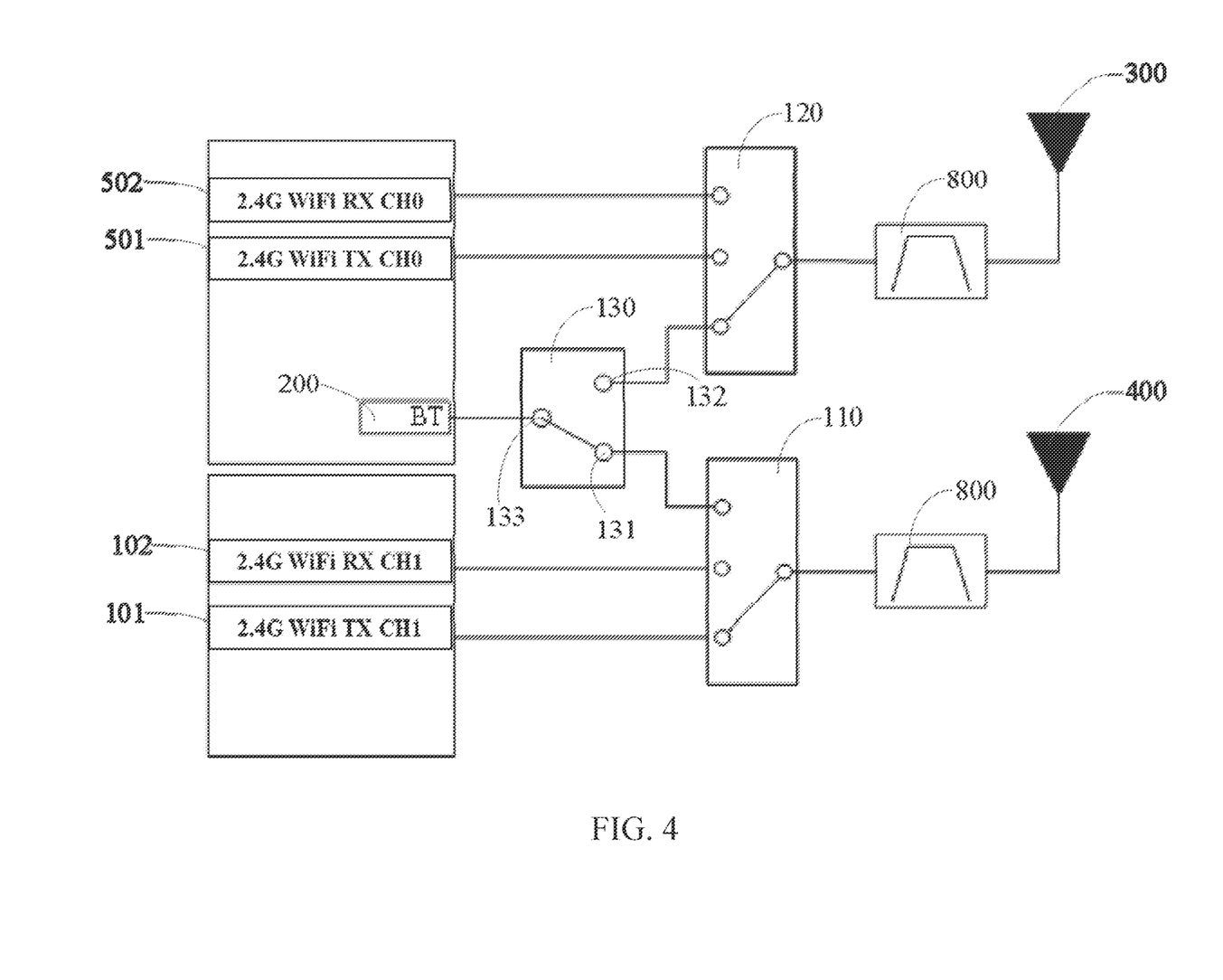
FIG. 4 is a fourth schematic structural diagram of a radio frequency circuit according to an embodiment of this application.

In some embodiments, the switch component includes a fourth switch 110, a fifth switch 120, and a sixth switch 130.

The first WIFI signal transmission port 100 is electrically connected to the second antenna 400 by using the fourth switch 110.

The second WIFI signal transmission port 500 is electrically connected to the first antenna 300 by using the fifth switch 120.

The sixth switch 130 is a single-pole double-throw switch, and the Bluetooth signal transmission port 200 is electrically connected to the fourth switch 110 and the fifth switch 120 by using the sixth switch 130.

In a case that the switch component is in the first state, the sixth switch 130 connects the Bluetooth signal transmission port 200 to the fifth switch 120, the fifth switch 120 connects the sixth switch 130 to the first antenna 300, and the fourth switch 110 connects the first WIFI signal transmission port 100 to the second antenna 400.

In a case that the switch component is in the second state, the sixth switch 130 connects the Bluetooth signal transmission port 200 to the fourth switch 110, the fourth switch 110 connects the sixth switch 130 to the second antenna 400, and the fifth switch 120 connects the second WIFI signal transmission port 500 to the first antenna 300.

In a case that the switch component is in the third state, the fourth switch 110 connects the first WIFI signal transmission port 100 to the second antenna 400, and the fifth switch 120 connects the second WIFI signal transmission port 500 to the first antenna 300.

In some embodiments, as shown in FIG. 3, the fourth switch 110, the fifth switch 120, and the sixth switch 130 may all be single-pole double-throw switches. A movable end of the fourth switch 110 is electrically connected to the second antenna 400 by using the filter 800, a first fixed end of the fourth switch 110 is electrically connected to the first WIFI signal transmission port 100, and a second fixed end of the fourth switch 110 is electrically connected to a first output connection point 131. A movable end of the fifth switch 120 is electrically connected to the first antenna 300 by using the filter 800, a first fixed end of the fifth switch 120 is electrically connected to the second WIFI signal transmission port 500, and a second fixed end of the fifth switch 120 is electrically connected to a second output connection point 132.

In some embodiments, in a case that the switch component is in the first state, an input end 133 of the sixth switch 130 is connected to the second output connection point 132, and the movable end of the fifth switch 120 is connected to the second fixed end of the fifth switch 120, to connect the Bluetooth signal transmission port 200 to the first antenna 300; and the movable end of the fourth switch 110 is connected to the first fixed end of the fourth switch 110, to connect the first WIFI signal transmission port 100 to the second antenna 400.

In a case that the switch component is in the second state, the input end 133 of the sixth switch 130 is connected to the first output connection point 131, and the movable end of the fourth switch 110 is connected to the second fixed end of the fourth switch 110, to connect the Bluetooth signal transmission port 200 to the second antenna 400; and the movable end of the fifth switch 120 is connected to the first fixed end of the fifth switch 120, to connect the second WIFI signal transmission port 500 to the first antenna 300.

In a case that the switch component is in the third state, the movable end of the fourth switch 110 is connected to the first fixed end of the fourth switch 110, to connect the first WIFI signal transmission port 100 to the second antenna 400; and the movable end of the fifth switch 120 is connected to the first fixed end of the fifth switch 120, to connect the second WIFI signal transmission port 500 to the first antenna 300.

In this implementation, through setting, the fourth switch 110, the fifth switch 120, and the sixth switch 130 cooperate with each other, so that the switch component switches among the first state, the second state, and the third state.

In some embodiments, the fourth switch 110 and the fifth switch 120 are each a single-pole three-throw switch, the first WIFI signal transmission port 100 includes a first receive sub-port 101 and a first transmit sub-port 102, and the first receive sub-port 101, the first transmit sub-port 102, and a first output connection point 131 of the sixth switch 130 are separately electrically connected to the second antenna 400 by using the fourth switch 110.

The second WIFI signal transmission port 500 includes a second receive sub-port 501 and a second transmit sub-port 502, and the second receive sub-port 501, the second transmit sub-port 502, and a second output connection point 132 of the sixth switch 130 are separately electrically connected to the first antenna 300 by using the fifth switch 120.

An input end 133 of the sixth switch 130 is electrically connected to the Bluetooth signal transmission port 200.

As shown in FIG. 4, in some embodiments, the fourth switch 110 and the fifth switch 120 are each a single-pole three-throw switch. The movable end of the fourth switch 110 is electrically connected to the second antenna 400 by using the filter 800, and the movable end of the fourth switch 110 may choose to be connected to one of the first receive subport 101, the first transmit subport 102, or the first output connection point 131 of the sixth switch 130. In this way, when the electronic device transmits data by using Bluetooth, the movable end of the fourth switch 110 may be connected to the first output connection point 131; when the electronic device receives data by using WIFI, the movable end of the fourth switch 110 may be connected to the first receive sub-port 101; and when the electronic device sends data by using WIFI, the movable end of the fourth switch 110 may be connected to the first transmit sub-port 102.

Correspondingly, the movable end of the fifth switch 120 is electrically connected to the first antenna 300 by using the filter 800, and the movable end of the fifth switch 120 may choose to be connected to one of the second receive sub-port 501, the second transmit sub-port 502, or the second output connection point 132 of the sixth switch 130. In this way, when the electronic device transmits data by using Bluetooth, the movable end of the fifth switch 120 may be connected to the second output connection point 132; when the electronic device receives data by using WIFI, the movable end of the fifth switch 120 may be connected to the second receive sub-port 501; and when the electronic device sends data by using WIFI, the movable end of the fifth switch 120 may be connected to the second transmit sub-port 502.

In some embodiments, the radio frequency circuit further includes a control element and a detection element, the switch component and the detection element are separately electrically connected to the control element, and the first antenna 300 and the second antenna 400 are separately electrically connected to the detection element.

The detection element is configured to detect signal strength of the first antenna 300 and is configured to detect signal strength of the second antenna 400, and the control element is configured to control, based on a detection result of the detection element, the switch component to switch among the first state, the second state, and the third state.

In some embodiments, the control element may be a processor in the electronic device, and the detection element may include a chip used to detect WIFI signal strength and a chip used to detect Bluetooth signal strength. In addition, the signal strength may also refer to a bit error rate of an antenna.

In some embodiments, in a case that the Bluetooth signal transmission port 200 is in an operating state and the switch component is in the first state, if the detection element detects that the signal strength of the first antenna 300 is less than a first preset value, the control element is configured to control the switch component to switch from the first state to the second state.

In some embodiments, signal strength at different locations in the electronic device may be different. For example, when an antenna is shielded by a body of a user, signal strength of the antenna is relatively weak. Therefore, when it is detected that signal strength of the first antenna 300 is relatively weak, an operating state may be switched by using the switch component, so that the second antenna 400 replaces the first antenna 300 for signal receiving and transmitting, thereby improving Bluetooth signal quality.

In some embodiments, the first preset value may be a preset threshold of Bluetooth signal strength. The detection element detects the Bluetooth signal strength. When the Bluetooth signal strength is less than the first preset value, it is determined that the signal strength of the first antenna 300 is relatively weak. In this case, the control element may switch the operating state of the switch component to the second operating state, so that Bluetooth performs signal receiving and transmitting by using the second antenna 400.

In some embodiments, in a case that the Bluetooth signal transmission port 200 is in an operating state and the switch component is in the second state, if the detection element detects that the signal strength of the second antenna 400 is less than a second preset value, the control element is configured to control the switch component to switch from the second state to the first state.

In some embodiments, the second preset value may be a preset threshold of Bluetooth signal strength. A value of the second preset value may be the same as a value of the first preset value. The detection element detects the Bluetooth signal strength. When the Bluetooth signal strength is less than the second preset value, it is determined that the signal strength of the second antenna 400 is relatively weak. In this case, the control element may switch the operating state of the switch component to the first operating state, so that Bluetooth performs signal receiving and transmitting by using the first antenna 300.

In some embodiments, in a case that the Bluetooth signal transmission port 200 is in a non-operating state, the control element is configured to control the switch component to switch to the third state.

In this implementation, in a case that the Bluetooth signal transmission port 200 is in the non-operating state, that is, when the Bluetooth is in a disabled state, the switch component may be switched to the third state. In this way, the first antenna 300 and the second antenna 400 simultaneously serve as signal transceiver antennas of WIFI, thereby further improving WIFI signal quality.

In some embodiments, the radio frequency circuit further includes a seventh switch and an eighth switch, the third connection point 703 of the second switch 700 is electrically connected to the first antenna 300 by using the seventh switch, and the fourth connection point 704 of the second switch 700 is electrically connected to the second antenna 400 by using the eighth switch, where the seventh switch and the eighth switch are single-pole double-throw switches.

The switch component further includes a fourth state and a fifth state. In a case that the switch component is in the fourth state, the switch component connects the Bluetooth signal transmission port 200 to the first antenna 300, and the switch component connects the first WIFI signal transmission port 100 to the first antenna 300.

In a case that the switch component is in the fifth state, the switch component connects the Bluetooth signal transmission port 200 to the second antenna 400, and the switch component connects the first WIFI signal transmission port 100 to the second antenna 400.

In some embodiments, the seventh switch includes a first operating state and a second operating state, a movable end of the seventh switch is electrically connected to the first antenna 300, a first fixed end of the seventh switch is electrically connected to the third connection point 703 of the second switch 700, and a second fixed end of the seventh switch is electrically connected to the fourth connection point 704 of the second switch 700. In a case that the seventh switch is in the first operating state, the movable end of the seventh switch is connected to the third connection point 703 of the second switch 700. In this case, the first antenna 300 is connected to the third connection point 703. When the seventh switch is in the second operating state, the movable end of the seventh switch is connected to the fourth connection point 704 of the second switch 700. In this case, the first antenna 300 is connected to the fourth connection point 704.

The eighth switch includes a first operating state and a second operating state, a movable end of the eighth switch is electrically connected to the second antenna 400, a first fixed end of the eighth switch is electrically connected to the fourth connection point 704 of the second switch 700, and a second fixed end of the seventh switch is electrically connected to the third connection point 703 of the second switch 700. In a case that the eighth switch is in the first operating state, the movable end of the eighth switch is connected to the fourth connection point 704 of the second switch 700. In this case, the second antenna 400 is connected to the fourth connection point 704. When the eighth switch is in the second operating state, the movable end of the eighth switch is connected to the third connection point 703 of the second switch 700. In this case, the second antenna 400 is connected to the third connection point 703.

In some embodiments, in a case that it is detected that the signal strength of the second antenna 400 is less than the second preset value, the signal strength of the first antenna 300 is greater than the first preset value, and both the first WIFI signal transmission port 100 and the Bluetooth signal transmission port 200 are in the operating state, the switch component may be switched to a fourth state. In this case, the WIFI and the Bluetooth share the first antenna 300. When the switch component is in the fourth state, the seventh switch is in the first operating state, and the eighth switch is in the second operating state.

Correspondingly, in a case that it is detected that the signal strength of the first antenna 300 is less than the first preset value, the signal strength of the second antenna 400 is greater than the second preset value, and both the first WIFI signal transmission port 100 and the Bluetooth signal transmission port 200 are in the operating state, the switch component may be switched to a fifth state. In this case, the WIFI and the Bluetooth share the second antenna 400. When the switch component is in the fifth state, the seventh switch is in the second operating state, and the eighth switch is in the first operating state.

It should be noted that the control element is configured to control the switch component to switch among the first state, the second state, the third state, the fourth state, and the fifth state based on a detection result of the detection element.

An embodiment of this application further provides an electronic device, including the radio frequency circuit in the foregoing embodiment. For a structure of the radio frequency circuit, refer to the descriptions in the foregoing embodiment. Details are not described herein again. Because the electronic device provided in the embodiments of this application uses a structure of the radio frequency circuit in the foregoing embodiment, the electronic device provided the embodiments of the present application can implement all beneficial effects of the radio frequency circuit in the foregoing embodiment.

In some embodiments, the radio frequency circuit includes a first antenna 300 and a second antenna 400, and the first antenna 300 and the second antenna 400 are disposed on two opposite sides of the electronic device.

In some embodiments, in a process of using the electronic device, a user generally holds one side of the electronic device. An antenna on the side held by the user is folded by the hand of the user, and therefore signal strength of the antenna is weakened. Therefore, when signal strength of an antenna on one side of the electronic device is weak because the antenna is shielded, an antenna on the other side of the electronic device is generally not shielded, and signal strength of the antenna on the other side of the electronic device is generally better. Based on this, in the embodiments of this application, the first antenna 300 and the second antenna 400 are respectively disposed on two opposite sides of the electronic device. In this way, when signal strength of one of the first antenna 300 or the second antenna 400 is relatively weak due to occlusion of the user, an operating state may be switched by using a switch component, so that the other antenna with relatively good signal strength participates in signal receiving and transmitting. Therefore, WIFI signal quality or Bluetooth signal quality of the electronic device is further improved.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A radio frequency circuit, comprising a first WIFI signal transmission port, a Bluetooth signal transmission port, a switch component, a first antenna, and a second antenna, wherein:
    the first WIFI signal transmission port is separately electrically connected to the first antenna and the second antenna by using the switch component, and the Bluetooth signal transmission port is separately electrically connected to the first antenna and the second antenna by using the switch component;
    when the switch component is in a first state, the switch component connects the Bluetooth signal transmission port to the first antenna, and the switch component connects the first WIFI signal transmission port to the second antenna;
    when the switch component is in a second state, the switch component connects the Bluetooth signal transmission port to the second antenna, and the switch component connects the first WIFI signal transmission port to the first antenna;
    wherein the radio frequency circuit further comprises a second WIFI signal transmission port, and the second WIFI signal transmission port is separately electrically connected to the first antenna and the second antenna by using the switch component;
    when the switch component is in a third state, one of the first WIFI signal transmission port or the second WIFI signal transmission port is connected to the first antenna, and the other is connected to the second antenna;
    the switch component comprises a first switch, a second switch, and a third switch;
    the first WIFI signal transmission port is electrically connected to the second antenna by using the first switch;
    the second WIFI signal transmission port is electrically connected to the first antenna by using the second switch;
    the third switch is a single-pole double-throw switch, and the Bluetooth signal transmission port is electrically connected to the first switch and the second switch by using the third switch;
    when the switch component is in the first state, the third switch connects the Bluetooth signal transmission port to the second switch, the second switch connects the third switch to the first antenna, and the first switch connects the first WIFI signal transmission port to the second antenna;
    when the switch component is in the second state, the third switch connects the Bluetooth signal transmission port to the first switch, the first switch connects the third switch to the second antenna, and the second switch connects the second WIFI signal transmission port to the first antenna; and
    when the switch component is in the third state, the first switch connects the first WIFI signal transmission port to the second antenna, and the second switch connects the second WIFI signal transmission port to the first antenna.

2. The radio frequency circuit according to claim 1, wherein the fourth first switch and the fifth second switch are each a single-pole three-throw switch, the first WIFI signal transmission port comprises a first receive sub-port and a first transmit sub-port, and the first receive sub-port, the first transmit sub-port, and a first output connection point of the sixth third switch are separately electrically connected to the second antenna by using the fourth first switch;
    the second WIFI signal transmission port comprises a second receive sub-port and a second transmit sub-port, and the second receive sub-port, the second transmit sub-port, and a second output connection point of the sixth third switch are separately electrically connected to the first antenna by using the fifth second switch; and
    an input end of the sixth third switch is electrically connected to the Bluetooth signal transmission port.

3. The radio frequency circuit according to claim 1, wherein the radio frequency circuit further comprises a control element and a detection element, the switch component and the detection element are separately electrically connected to the control element, and the first antenna and the second antenna are separately electrically connected to the detection element, wherein:
    the detection element is configured to detect signal strength of the first antenna and is configured to detect signal strength of the second antenna, and the control element is configured to control, based on a detection result of the detection element, the switch component to switch among the first state, the second state, and the third state.

4. The radio frequency circuit according to claim 3, wherein when the Bluetooth signal transmission port is in an operating state and the switch component is in the first state, when the detection element detects that the signal strength of the first antenna is less than a first preset value, the control element is configured to control the switch component to switch from the first state to the second state;
    when the Bluetooth signal transmission port is in an operating state and the switch component is in the second state, when the detection element detects that the signal strength of the second antenna is less than a second preset value, the control element is configured to control the switch component to switch from the second state to the first state; or
    when the Bluetooth signal transmission port is in a non-operating state, the control element is configured to control the switch component to switch to the third state.

5. An electronic device, comprising a radio frequency circuit, wherein the radio frequency circuit comprises a first WIFI signal transmission port, a Bluetooth signal transmission port, a switch component, a first antenna, and a second antenna, wherein:

the first WIFI signal transmission port is separately electrically connected to the first antenna and the second antenna by using the switch component, and the Bluetooth signal transmission port is separately electrically connected to the first antenna and the second antenna by using the switch component;

when the switch component is in a first state, the switch component connects the Bluetooth signal transmission port to the first antenna, and the switch component connects the first WIFI signal transmission port to the second antenna;

when the switch component is in a second state, the switch component connects the Bluetooth signal transmission port to the second antenna, and the switch component connects the first WIFI signal transmission port to the first antenna;

wherein the radio frequency circuit further comprises a second WIFI signal transmission port, and the second WIFI signal transmission port is separately electrically connected to the first antenna and the second antenna by using the switch component;

when the switch component is in a third state, one of the first WIFI signal transmission port or the second WIFI signal transmission port is connected to the first antenna, and the other is connected to the second antenna;

the switch component comprises a first switch, a second switch, and a third switch;

the first WIFI signal transmission port is electrically connected to the second antenna by using the first switch;

the second WIFI signal transmission port is electrically connected to the first antenna by using the second switch; and the third switch is a single-pole double-throw switch, and the Bluetooth signal transmission port is electrically connected to the first switch and the second switch by using the third switch;

when the switch component is in the first state, the third switch connects the Bluetooth signal transmission port to the second switch, the second switch connects the third switch to the first antenna, and the first switch connects the first WIFI signal transmission port to the second antenna;

when the switch component is in the second state, the third switch connects the Bluetooth signal transmission port to the first switch, the first switch connects the third switch to the second antenna, and the second switch connects the second WIFI signal transmission port to the first antenna; and when the switch component is in the third state, the first switch connects the first WIFI signal transmission port to the second antenna, and the second switch connects the second WIFI signal transmission port to the first antenna.

6. The electronic device according to claim 5, wherein the first antenna and the second antenna of the radio frequency circuit are disposed on two opposite sides of the electronic device.

7. The electronic device according to claim 5, wherein the fourth first switch and the fifth second switch are each a single-pole three-throw switch, the first WIFI signal transmission port comprises a first receive sub-port and a first transmit sub-port, and the first receive sub-port, the first transmit sub-port, and a first output connection point of the sixth third switch are separately electrically connected to the second antenna by using the fourth first switch;

the second WIFI signal transmission port comprises a second receive sub-port and a second transmit sub-port, and the second receive sub-port, the second transmit sub-port, and a second output connection point of the sixth third switch are separately electrically connected to the first antenna by using the fifth second switch; and an input end of the sixth third switch is electrically connected to the Bluetooth signal transmission port.

8. The electronic device according to claim 5, wherein the radio frequency circuit further comprises a control element and a detection element, the switch component and the detection element are separately electrically connected to the control element, and the first antenna and the second antenna are separately electrically connected to the detection element, wherein:

the detection element is configured to detect signal strength of the first antenna and is configured to detect signal strength of the second antenna, and the control element is configured to control, based on a detection result of the detection element, the switch component to switch among the first state, the second state, and the third state.

9. The electronic device according to claim 8, wherein when the Bluetooth signal transmission port is in an operating state and the switch component is in the first state, when the detection element detects that the signal strength of the first antenna is less than a first preset value, the control element is configured to control the switch component to switch from the first state to the second state;

when the Bluetooth signal transmission port is in an operating state and the switch component is in the second state, when the detection element detects that the signal strength of the second antenna is less than a second preset value, the control element is configured to control the switch component to switch from the second state to the first state; or when the Bluetooth signal transmission port is in a non-operating state, the control element is configured to control the switch component to switch to the third state.

* * * * *